US006794333B2

(12) United States Patent
Slimane et al.

(10) Patent No.: US 6,794,333 B2
(45) Date of Patent: Sep. 21, 2004

(54) ZNO-BASED REGENERABLE SULFUR SORBENTS FOR FLUID-BED/TRANSPORT REACTOR APPLICATIONS

(75) Inventors: Rachid B. Slimane, Roselle, IL (US); Javad Abbasian, Naperville, IL (US); Brett E. Williams, Sturgeon Bay, WI (US)

(73) Assignee: Gas Technology Institute, Des Plaines, IL (US)

( * ) Notice: Subject to any disclaimer, the term of this patent is extended or adjusted under 35 U.S.C. 154(b) by 217 days.

(21) Appl. No.: 10/086,168

(22) Filed: Feb. 28, 2002

(65) Prior Publication Data

US 2003/0162659 A1 Aug. 28, 2003

(51) Int. Cl.[7] .................................................. B01J 20/00
(52) U.S. Cl. ...................... 502/400; 502/407; 502/415
(58) Field of Search ........................ 502/300, 400, 502/415, 407, 324, 331, 332, 336, 338, 342, 346, 350, 351

(56) References Cited

U.S. PATENT DOCUMENTS

| | | | | |
|---|---|---|---|---|
| 3,849,296 A | * | 11/1974 | Hensley, Jr. ............. | 208/216 R |
| 3,935,295 A | * | 1/1976 | La Hue et al. ......... | 423/240 R |
| 4,525,472 A | * | 6/1985 | Morales et al. ............. | 502/323 |
| 4,542,116 A | * | 9/1985 | Bertolacini et al. ........... | 502/65 |
| 4,619,908 A | | 10/1986 | Cheng et al. | |
| 4,717,708 A | | 1/1988 | Cheng et al. | |
| 5,494,880 A | | 2/1996 | Siriwardane | |
| 5,866,503 A | | 2/1999 | Siriwardane | |
| 5,972,835 A | | 10/1999 | Gupta | |

FOREIGN PATENT DOCUMENTS

| WO | WO 9732813 A1 | * | 9/1997 | ........... C01B/17/04 |
|---|---|---|---|---|

\* cited by examiner

*Primary Examiner*—Stanley S. Silverman
*Assistant Examiner*—Edward M. Johnson
(74) *Attorney, Agent, or Firm*—Mark E. Fejer (57) ABSTRACT

A method for producing regenerable sulfur sorbents in which a support material precursor is mixed with isopropanol and a first portion of deionized water at an elevated temperature to form a sol mixture. A metal oxide precursor comprising a metal suitable for use as a sulfur sorbent is dissolved in a second portion of deionized water, forming a metal salt solution. The metal salt solution and the sol mixture are mixed with a sol peptizing agent while heating and stirring, resulting in formation of a peptized sol mixture. The metal oxide precursor is dispersed substantially throughout the peptized sol mixture, which is then dried, forming a dry peptized sol mixture. The dry peptized sol mixture is then calcined and the resulting calcined material is then converted to particles.

7 Claims, 7 Drawing Sheets

ZNO-BASED REGENERABLE SULFUR SORBENTS FOR FLUID-BED/TRANSPORT REACTOR APPLICATIONS

This invention was made with Government support under Prime Contract No. DE-AC21-94MC31089 awarded by the Department of Energy. The Government has certain rights in this invention.

BACKGROUND OF THE INVENTION

1. Field of the Invention

This invention relates to regenerable sorbents for use in desulfurization applications in fluidized beds, particularly in transport reactors. More particularly, this invention relates to sorbents that are resistant to attrition and that maintain chemical reactivity under the conditions of desulfurization applications in such reactors.

2. Description of Related Art

When coal is gasified, sulfur that is present in most coals is converted to sulfur bearing pollutant gases, in particular, hydrogen sulfide ($H_2S$). When coal is burned, sulfur that is present in most coals is converted to sulfur dioxide ($SO_2$) which, unless otherwise removed, is emitted with the coal combustion flue gases.

Development of a sorbent in a form suitable for removal of hydrogen sulfide from coal derived fuel gases, as well as for removal of sulfur dioxide from coal combustion flue gases, has been a challenging problem because of the requirements imposed for successful operation of sulfur removal systems. The sorbents should be operational at temperatures of 370° to 750° C. in the presence of reducing gases such as hydrogen and carbon monoxide. To obtain the necessary contact between the sulfur containing gas streams and the sorbents, the sorbents are typically incorporated into pellets or other particles suitable for use in fluid bed/transport reactors.

In use, sorbent particles undergo repeated cycles of sulfur absorption and regeneration which, in turn, results in either rapid and continuous decrease in reactivity or physical deterioration due to spalling. These deficiencies are thought to result from the decrease in surface area of the high surface area material in which the reactive oxide is disposed, which decrease occurs as a consequence of prolonged exposure to high temperatures. Internal porosity also decreases, thereby reducing surface area available for contact by the sulfur containing gas stream with the reactive oxide. Accordingly, it is apparent that there is a need for alternative sorbent preparations which overcome the disadvantages of conventional sorbent preparation techniques and provide sorbents with high attrition resistance and chemical reactivity.

Two important characteristics desirable in sorbents are resistance to attrition and maintaining of chemical reactivity. Numerous techniques have been developed over the years which are designed to improve the attrition resistance of sorbent particles. However, in many cases, these techniques are not suitable for the particular materials used to form particles for a given application. In addition, many of these techniques are limited to use with particular particles sizes. Conventional sorbent preparation techniques, such as coprecipitation and solid oxide mixing followed by granulation or spray drying are generally not suitable for preparing sorbents having attrition resistance and chemical reactivity that meet the stringent requirements of desulfurization applications in fluidized beds and transport reactors. These techniques require very high thermal treatment temperatures to impart physical strength and, as a result, they often produce sorbents with modest reactivity. This appears to be particularly true for sorbents based on zinc oxide ($ZnO$).

Research on the development of regenerable sorbents based upon ZnO has been extensive. Briefly, work prior to 1994 focused on extending the applicability of zinc-based sorbents to higher and higher temperatures. However, because of the tendency of ZnO to reduce and the higher vapor pressures of metallic zinc at these high temperatures, losses of zinc were reported. This problem was addressed through the compounding of ZnO with titanium oxide ($TiO_2$), resulting in improvement in temperature operability up to 725° C. With the shift in interest to desulfurization temperatures in the range of 343 to 538° C. (650 to 1100° F.), several approaches have been taken to enhance the reactivity of zinc-based sorbents. One researcher, for example, indicated that the compounding of ZnO with $TiO_2$ is accompanied by lower reactivity and stressed the need to investigate alternative supports. Researchers proceeded by imparting improvements to earlier versions of zinc-based sorbents that were originally developed for the higher temperature range. One such sorbent was developed by a granulation technique for fluidized-bed applications in the higher temperature range and was tested at a pilot-scale level. However, when tested under transport reactor mode conditions at 538° C., this sorbent was found to suffer attrition problems. A spray-dried version of this sorbent was also reported to exhibit an excessive attrition rate. These results underscore the difficulty of improving sorbent attrition to meet transport reactor requirements while maintaining practical chemical reactivity at moderate temperature.

U.S. Pat. No. 5,494,880 and related U.S. Pat. No. 5,866,503 teach durable regenerable sorbent pellets for removal of hydrogen sulfide coal gas containing titania as a diluent, high surface area silica gel, and a binder. These materials are mixed, moistened and formed into pellets which are then dried and calcined. U.S. Pat. No. 5,972,835 teaches a method for producing fluidizable, substantially spherical particulate material having improved attrition resistance and an average particle size from about 100 to about 400 microns by spray drying a slurry comprising inorganic starting materials and an organic binder.

SUMMARY OF THE INVENTION

Accordingly, it is one object of this invention to provide a method for producing regenerable sulfur sorbents for fluid bed/transport reactor applications having attrition resistance and chemical reactivity required by desulfurization applications therein.

This and other objects of this invention are addressed by a method for producing regenerable sulfur sorbents in which a support material precursor is mixed with isopropanol and a first portion of deionized water at an elevated temperature to form a sol mixture. A metal oxide precursor comprising a metal suitable for use as a sulfur sorbent is dissolved in a second portion of deionized water, forming a metal salt solution. The metal salt solution and the sol mixture are mixed with a sol peptizing agent while heating and stirring, resulting in formation of a peptized sol mixture. The metal oxide precursor is dispersed substantially throughout the peptized sol mixture, which is then dried, forming a dry peptized sol mixture. The dry peptized sol mixture is then calcined. The resulting calcined material is then converted to particles.

DETAILED DESCRIPTION OF THE PRESENTLY PREFERRED EMBODIMENTS

The present invention provides new sorbent preparation techniques based on the sol-gel processing of inorganic and organic precursors. Sol-gel processing is defined broadly as the preparation of ceramic materials by preparation of a sol, gelation of the sol, and removal of the solvent. A sol is a colloidal suspension of solid particles in a liquid and may be produced from inorganic or organic precursors. For example, common precursors for aluminum oxide include inorganic salts such as $Al(NO_3)_3$ and organic compounds such as $Al(OC_4H_9)_3$. The latter is an example of an alkoxide, the class of precursors widely used in sol-gel research because they react readily with water (i.e., hydrolysis reaction). Gels have a huge interfacial area, typically 300–1000 $m^2/g$, and this enormous area serves as a driving force to bring about sintering at exceptionally low temperatures, compared to ordinary ceramic materials. Therefore, a considerable amount of the extraordinary properties (high surface areas and small pore sizes) of unfired gels are retained following calcination, offering the possibility of using the gel as a substrate for chemical reactions. These properties, characteristic of inorganic gels as a result of low-temperature processing, are unattainable by "conventional" sorbent preparation techniques. The key to this approach for sorbent preparation is that it is not necessary to calcine these sorbents at very high temperatures, as a result of which the desirable characteristics of unfired gels are retained following calcination at the moderate temperature of 450° C.

The method of this invention will be discussed hereinbelow in the context of preparation of effective zinc titanate ($ZnO-TiO_2$) sorbents. However, the method of this invention is equally applicable to preparation of other sorbents based on ZnO, but with alternative suitable support materials, such as zirconia ($ZrO_2$), silica ($SiO_2$), etc. In addition, the sorbent synthesis methods of this invention are also suitable for use in the preparation of effective sorbents based upon other metal oxides, such as copper oxide (CuO), manganese oxide ($Mn_2O_3$) and iron oxide ($Fe_2O_3$) with a suitable support material, such as alumina ($Al_2O_3$). These latter sorbents can be used for the removal of hydrogen sulfide ($H_2S$) from coal derived fuel gases as well as sulfur dioxide ($SO_2$) removal from coal combustion flue gases.

In accordance with one embodiment of this invention, a stable titania sol is first prepared using deionized water, a titania precursor (titanium isopropoxide, $C_{12}H_{28}O_4Ti$, 97% purity) and isopropanol. This is accomplished by diluting a predetermined amount of the titania precursor with isopropanol, and adding the resulting mixture to a beaker placed on a hot-plate/stir-plate and containing approximately the same volume of deionized water, resulting in the immediate formation of a precipitate. In accordance with one embodiment of this invention, this stable sol may be prepared by refluxing overnight. However, due to the time-consuming nature of this step, in accordance with an alternative embodiment, the deionized water, titanium isopropoxide and isopropanol mixture is stirred vigorously, slowly heated to 50–70° C., and held there until about 50% volume reduction occurs through evaporation of alcohol and some of the water. The evaporated material may be recovered and recycled for reintroduction into the process.

In a separate container, a desired amount of zinc oxide precursor (zinc nitrate hexahydrate, $N_2O_6Zn-6H_2O$, 98% purity) is dissolved in an approximately equal volume of deionized water. The prepared zinc nitrate solution is then added to the titania sol mixture while still heating and stirring. A predetermined amount of nitrate acid ($HNO_3$) is also added to peptize the sol. Stirring of the resulting mixture is continued, typically for at least about three hours, to ensure good dispersion of the zinc oxide precursor. The contents of the beaker are then transferred to a metal or ceramic pan and allowed to dry overnight at about 115° C. The dried material is then recovered and calcined at a temperature of about 450° C. for about 4 hours, using a slow heating rate of 3° C./min. Granules from calcined material are then produced in the desired size range of about 45–300 microns, by crushing and sieving. The nominal ZnO content of the sorbents prepared in accordance with the method of this invention is in the range of about 10 to about 60 wt. %. The calcination temperature is preferably in the range of about 450° C. to 500° C. The size distribution of the particles produced in accordance with the method of this invention ranges from about 45 to 300 microns.

Granules from sorbents produced in accordance with the method of this invention, having a size in the range of about 45–180 microns, were introduced for testing into a high-pressure thermogravimetric analyzer, ambient pressure packed/fluidized bed reactors, and a high-pressure fluidized bed reactor. Relevant characteristics of fresh, as well as reacted, sorbent samples were determined, including composition by wet chemical analysis, physical properties (particles and skeletal densities, pore volume, total pore surface area, and median pore diameter) by mercury porosimetry (ASTM D4284-92) and BET surface area determined in accordance with ASTM D3663-99 (multi-point B.E.T.), and attrition resistance according to the ASTM D5757-95 method. The granular sorbents were evaluated for their rate of sulfur pickup, efficiency for hydrogen sulfide removal, effective capacity for sulfur absorption, and regenerability in an ambient pressure packed bed reactor. Desulfurization temperatures in the range of about 343° C. to about 538° C. (650° F. to 1000° F.) were investigated using simulated fuel gas mixtures ranging from simple $H_2S$—$H_2$—$H_2O$—$N_2$ to compositions simulating commercial fuel gas compositions (15% $H_2$, 24% CO, 6% $CO_2$, 0.5–2% $H_2S$ and 47–48.5% $N_2$).

EXAMPLE

In this example, a typical sorbent is produced on a laboratory scale in accordance with the method of this invention using a solution batch volume of about 0.725 liters (predicted yield of product for batch equals about 32.5 g).

450 ml of deionized water was added into a two liter beaker placed on a hot-plate/stir-plate and stirred vigorously with a magnetic stirring bar. To this beaker, 74.8 ml of titanium (IV) isopropoxide ($C_{12}H_{28}O_4Ti$, 97% purity, available from Alfa Aesar, located in Ward Hill, Mass.,) was added while continuing to vigorously stir. When the mixture is added to deionized water, a precipitate forms immediately. 25 ml of isopropanol were used to rinse out the Ti isopropoxides material from the graduated cylinder. The solution was stirred and heated to approximately 50–70° C. for an amount of time sufficient to allow about a twofold reduction in volume to occur. During this period, alcohol and some of the water evaporate. In a separate container, 48.4 g of zinc nitrate hexahydrate ($N_2O_6Zn$-$6H_2O$, 98% purity, available from Fisher Scientific, Itasca, Ill.) was dissolved in about 50 ml of deionized water. While still heating and stirring the titania sol mixture, the zinc nitrate solution was added together with 130 ml of 1M $HNO_3$ to peptize the sol. To ensure good dispersion of the zinc oxide precursor, the mixture was stirred for about three hours and then transferred to a metal pan and dried overnight in a drying oven at about 115° C. The dried material was removed from the oven and weighed. Thereafter, the dried material was calcined at 450° C. for four hours using a heating rate of 3° C./minute. To determine attrition resistance, the material was sized to a particle size distribution of about 45–180 microns. For other testing, the material was sized to a particle size distribution of about 75–125 microns.

To illustrate the exceptional characteristics of the ZnO—$TiO_2$ sorbents produced in accordance with the method of this invention, two formulations were used, the first having a nominal ZnO content of about 30% by weight and the second having a nominal ZnO content of about 40% by weight. The chemical analyses of these two formulations (designated "SS-354" and "SS-362C") together with the formulation of a zinc titanate sorbent produced by conventional means (baseline) are shown in Table 1. As can be seen, the ZnO content of the two formulations produced in accordance with the method of this invention is about ½ that of the baseline zinc titanate sorbent.

baseline sorbent. This combination of high porosity, high surface area and small pore diameters results in higher chemical reactivity and much higher attrition resistance for the sorbents produced in accordance with the method of this invention compared to the sorbent produced by conventional means.

Figure 1:
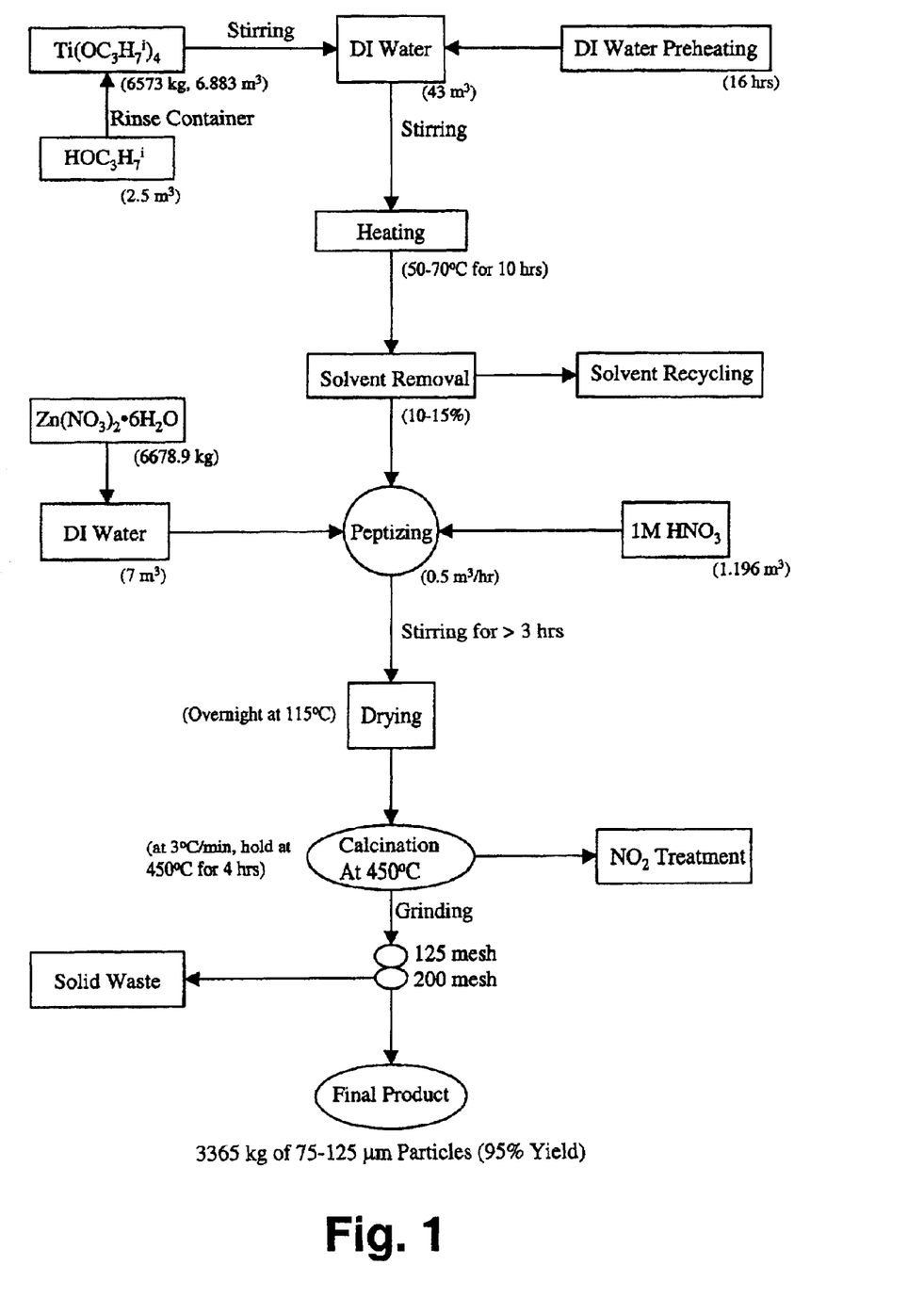
FIG. 1 is a flowsheet diagram for the production of zinc titanate sorbents at tonnage quantities in accordance with the method of this invention.
Figure 2:
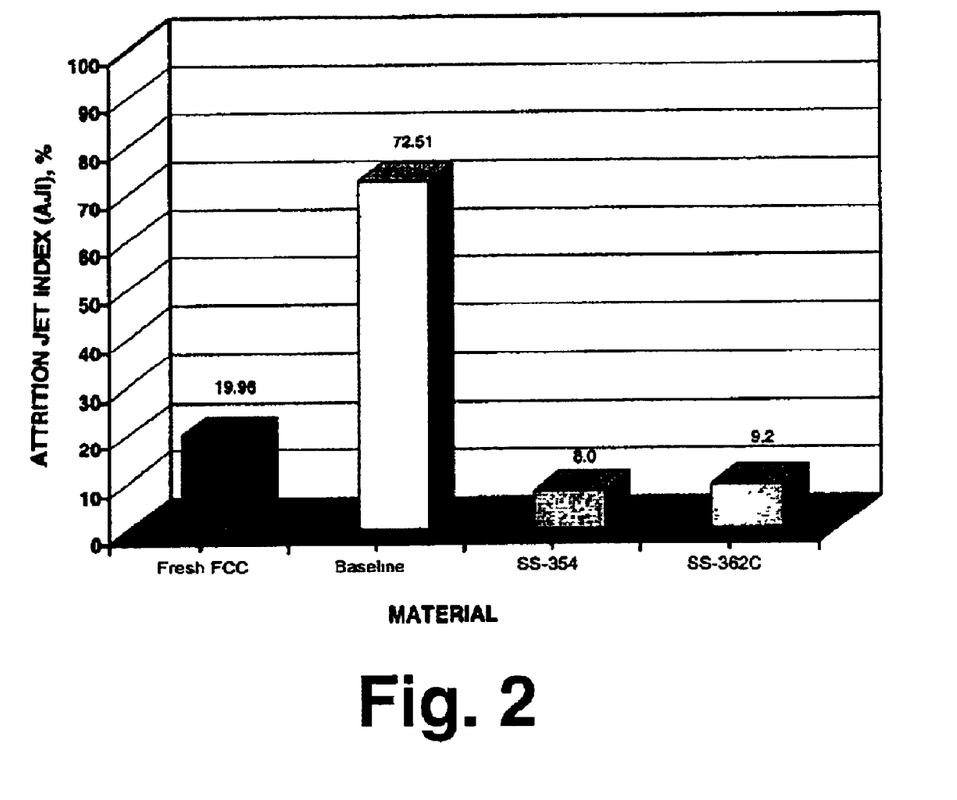
FIG. 2 is a diagram showing the attrition resistance for ZnO-based sorbents produced in accordance with the method of this invention compared to ZnO-based sorbents produced by conventional means.

FIG. 2 shows the results of attrition resistance tests conducted on two sorbents produced in accordance with the method of this invention as well as a comparison of the results with the results obtained from a conventionally produced sorbent and a baseline fluid cracking catalyst (FCC) material. The results are reported in terms of the attrition jet index (AJI) as defined by the ASTM D5757-95 procedure, which corresponds to a 5-hour loss. As shown in the figure, the sol-gel zinc titanates produced in accordance with the method of this invention had attrition losses that are about ½ that of the baseline FCC material and about ¹⁄₁₀ that of the conventionally produced zinc-based sorbent.

Figure 3:
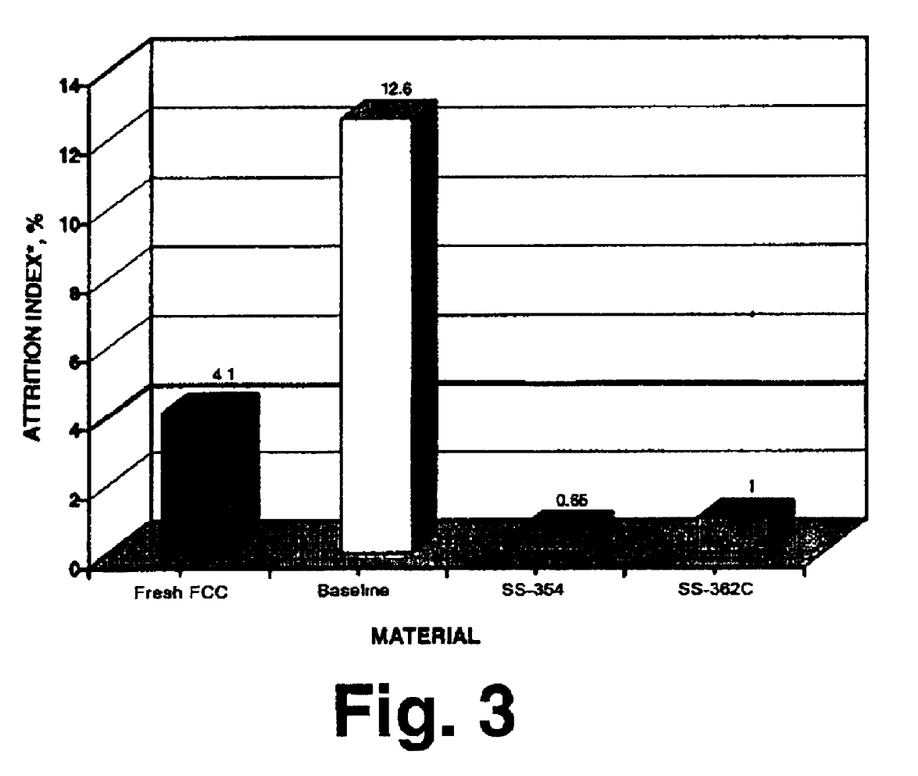
FIG. 3 is a diagram showing the attrition resistance of selected sorbents.

FIG. 3 shows a comparison between the performance of two sorbents produced in accordance with the method of this invention and the performance of the conventionally produced sorbent and the baseline FCC sorbent. Attrition resistance in this figure is reported as the average per hour loss due to attrition with the first hour loss not taken into consideration to eliminate any particle size effects on attrition (($5^{th}$ hr-$1^{st}$ hr)/4). As can be seen, the sorbents produced in accordance with the method of this invention demonstrated significantly lower attrition losses than the conventionally produced zinc titanate sorbent and greatly exceeded

TABLE 1

| Sorbent Designation | Chemical Analysis, wt. % | | | | | | | Theoretical Sulfur Capacity* (g S/100 g Sorbent) |
|---|---|---|---|---|---|---|---|---|
| | Zn | Cu | Mn | Fe | Ti | Al | Zr | |
| SS-354 | 19.4 | — | — | — | 30.0 | — | 13.7 | 9.52 |
| SS-362C | 27.4 | — | — | — | 34.7 | — | — | 13.44 |
| Baseline | 43.8 | — | — | — | 23.5 | — | — | 21.8 |

*Based on $ZnO + H_2S = ZnS + H_2O$

The results of physical characterization of the two selected sol-gel-derived sorbents produced in accordance with the method of this invention as well as those of the baseline sorbent produced by conventional means are shown in Table 2.

the stringent requirement of a given transport reactor, as indicated by the solid line in FIG. 3.

Desulfurization (sulfidation) breakthrough curves obtained from evaluation of the conventionally produced zinc titanate sorbent and the sol-gel sorbents produced in

TABLE 2

| Sorbent Designation | Main Reactive Metal | Particle (Hg) Density ($\rho_b$) (g/cm³) | Skeletal (He) Density ($\rho_a$) (g/cm³) | Hg Pore Volume (cm³/g) | Porosity[b] (%) | Surface Area (m²/g) | Median Pore Diameter (Å) |
|---|---|---|---|---|---|---|---|
| SS-354 | Zn | 2.53 | 4.12 | 0.153 | 38.6 | 56.92 | 110 |
| SS-362C | Zn | 2.47 | 4.12 | 0.162 | 40.1 | 50.10 | 125 |
| Baseline | Zn | 2.19 | 3.14 | 0.138 | 30.3 | 0.71 | 8200 |

[a]Corrected for inter-particle void
[b]Calculated based on corrected values as $(1 - \rho_b/\rho_a)*100$, or equivalently as $\rho_b$8(Hg Pore Volume)*100

Figure 4:
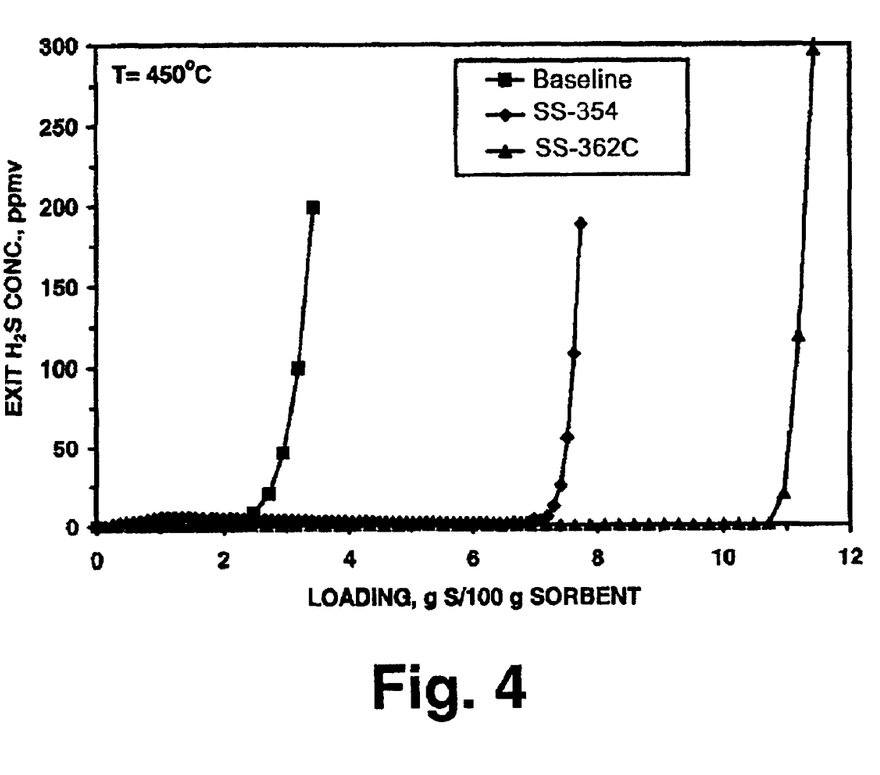
FIG. 4 is a diagram showing a comparison of sorbent desulfurization performance for sorbents produced in accordance with the method of this invention and sorbents produced by conventional means.

As can be seen, the sorbents produced in accordance with the method of this invention have similar densities and porosities to those of the baseline sorbent. However, the mercury pore surface areas of the sol-gel derived sorbents are one to two orders of magnitude higher than that of the baseline sorbent. The high surface areas of the sol-gel-derived sorbents are generally attributable to the substantially smaller diameters of the pores compared to those of the accordance with the method of this invention in a packed-bed reactor at 450° C. are shown in FIG. 4. All three sorbents were evaluated under the same operating conditions of sulfidation gas composition, sorbent bed configuration, space velocity, inlet $H_2S$ concentration, etc. As shown, the conventionally produced sorbent achieved an effective capacity of only about 3.5 g S/100 g sorbent, which represents about 16% of its theoretical sulfur capacity (see Table 1). By comparison, the sol-gel sorbents achieved effective capacities approximating 7.5 and 11.4 g S/100 g sorbent for the SS-354 and SS-362C sorbents, respectively. These values represent about 79% to about 84% of the theoretical sulfur capacity of each sorbent formulation.

Figure 5:
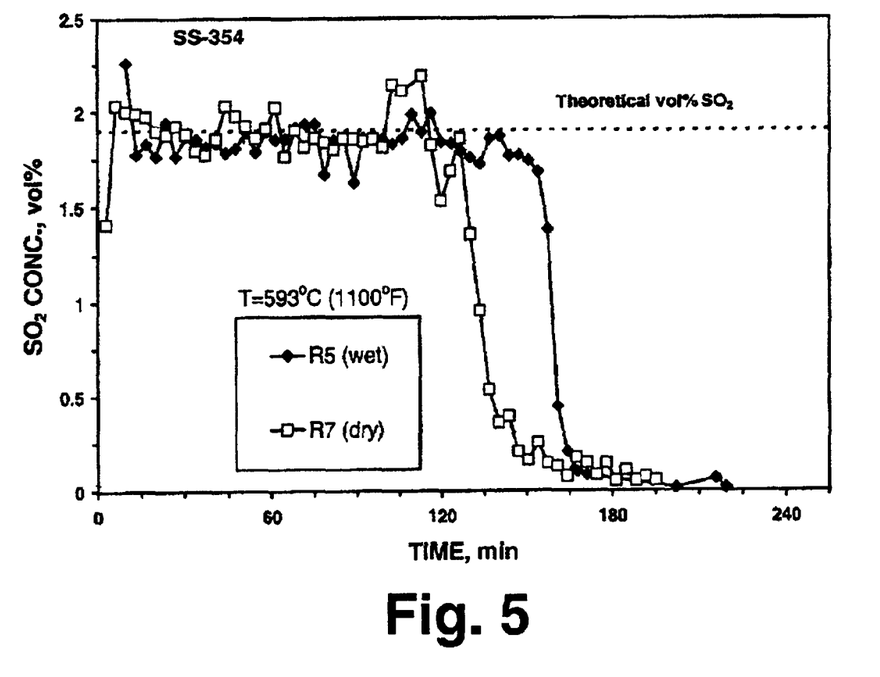
FIG. 5 is a diagram showing the regenerability of a ZnO sorbent produced in accordance with the method of this invention.

Sorbent regenerability tests carried out on the sol-gel zinc titanate sorbents produced in accordance with the method of this invention repeatedly showed that these sorbents could be fully regenerated at 593° C. (1100° F.) with dry oxidative gases. At a lower temperature of 538° C. (1000° F.), extensive testing showed that these sorbents could also be regenerated completely provided the regeneration gas contains steam, that is, "wet" gas. Steam at the 10% level is sufficient to ensure complete sorbent regeneration. FIG. 5 shows regeneration breakthrough curves for the SS-354 sorbent at 593° C. with dry and "wet" regeneration feed gases. As shown, in both cases, the $SO_2$ content of the regeneration product gas closely approaches theoretical value (based upon regeneration reaction stoichiometry and $O_2$ content of the feed gas) with a sharp breakthrough when the sorbent is fully regenerated. Therefore, the SS-354 sorbent can be successfully regenerated at 593° C. with or without steam in the feed gas.

Figure 6:
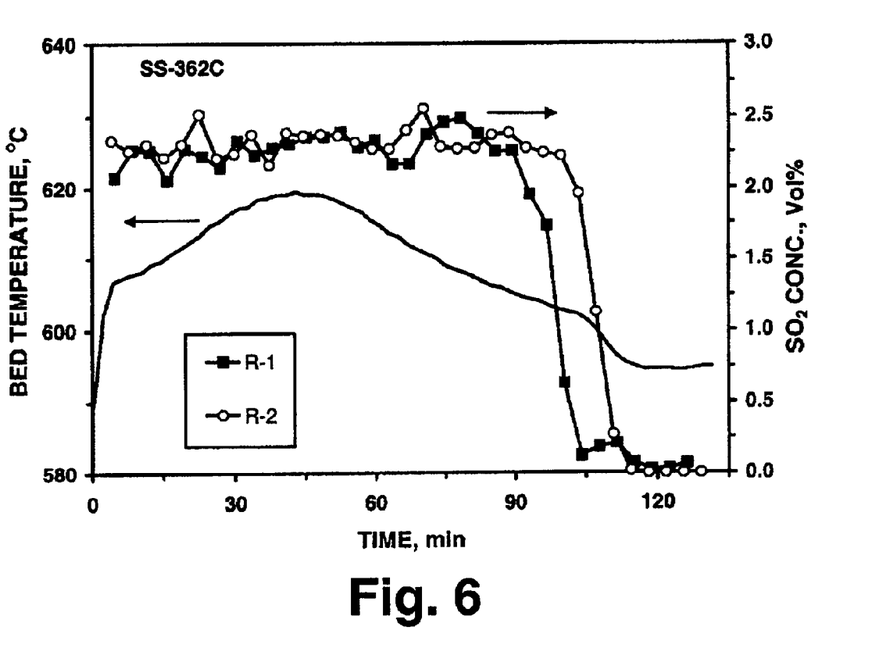
FIG. 6 is a diagram showing the regenerability of a second ZnO sorbent produced in accordance with the method of this invention.

The same is true for the SS-362C sorbent as shown in FIG. 6. In addition to regeneration breakthrough curves, FIG. 6 shows the temperature profile, measured by a thermocouple placed in the middle of the sorbent bed. As indicated, because of the low oxygen content (3 to 5 vol % $O_2$) used in these tests, the temperature was purposely controlled to less than about 625° C. Other multi-cycle tests showed that sorbent effectiveness could be retained during a cyclic sulfidation/regeneration process, provided the sorbent is not exposed to temperatures greater than about 675° C. (1250° F.).

Figure 7:
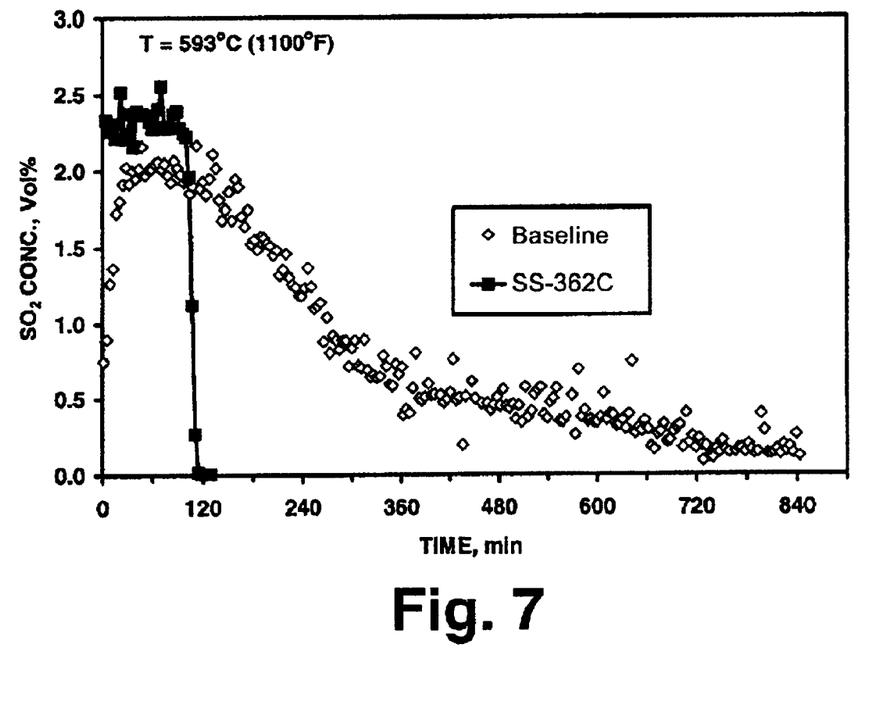
FIG. 7 is a diagram showing a comparison of the regenerabilities of zinc titanate sorbents produced in accordance with the method of this invention and by conventional means.

To assess the improved regenerability of this new class of Zn-based sorbents produced in accordance with the method of this invention compared to that of conventionally produced Zn-based sorbents, the conventionally produced zinc titanate sorbent was sulfided at 550° C. (to achieve a sulfur loading similar to that of the SS-362C sorbent) and then regenerated under the same conditions as the SS-362C sorbent (FIG. 6). As shown in FIG. 7, while it took only about 2 hours to fully regenerate the SS-362C sorbent, the conventionally produced sorbent, which was loaded (sulfided) to the same extent, required about 14 hours, and even after that period, the $SO_2$ concentration in the regeneration product gas was still being measured at about 0.2 vol % (i.e. 2000 ppmv $SO_2$). Also as shown in FIG. 7, regeneration of the conventionally produced sorbent is quite sluggish, a clear indication of significant sulfate formation. It is well established in the literature to date that zinc titanate cannot be efficiently regenerated at temperatures below about 625° C. Thus, the zinc titanate sorbents produced in accordance with the method of this invention, due to their regenerability at lower regeneration temperatures than conventionally produced sorbents, are believed to be unique.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for producing regenerable sulfur sorbents comprising the steps of:

mixing a support material precursor, isopropanol and a first portion of deionized water at an elevated temperature, forming a sol mixture;

dissolving a metal oxide precursor comprising a metal suitable for use as a sulfur sorbent in a second portion of deionized water, forming a metal salt solution;

mixing said sol mixture and said metal salt solution with a sol peptizing agent while heating and stirring, forming a peptized sol mixture;

dispersing said metal oxide precursor substantially throughout said peptized sol mixture;

drying said peptized sol mixture, forming a dry peptized sol mixture, and calcining said dry peptized sol mixture, forming a calcined material; and converting said calcined material to particles.

2. A method in accordance with claim 1, wherein said metal oxide is selected from the group consisting of zinc oxide and copper oxide.

3. A method in accordance with claim 2, wherein said metal oxide is zinc oxide.

4. A method in accordance with claim 1, wherein said support material is an oxide of an element selected from the group consisting of aluminum, zirconium, silicon and mixtures thereof.

5. A method in accordance with claim 1, wherein said dry peptized sol mixture is calcined at a temperature in a range of about 400° C. to about 500° C.

6. A method in accordance with claim 1, wherein said particles have a diameter in a range of about 45 microns to about 300 microns.

7. A method in accordance with claim 1, wherein said particles comprise a range of about 10% to about 60% by weight of said metal oxide.

* * * * *